3,427,472
THRESHOLD DETECTOR EMPLOYING TUNNEL DIODE-HOT CARRIER DIODE-TRANSISTOR IN COMBINATION WITH BACKWARD DIODE FOR ISOLATION
Friedrich A. Karner, Apalachin, N.Y., assignor to International Business Machines Corporation, Armonk, N.Y., a corporation of New York
Filed Nov. 12, 1965, Ser. No. 507,595
U.S. Cl. 307—235                  10 Claims
Int. Cl. H03k *17/58, 17/04*

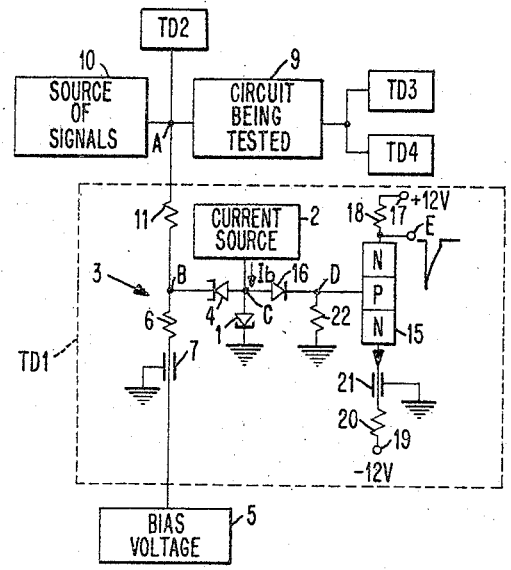
FIG. 1
FIG. 2
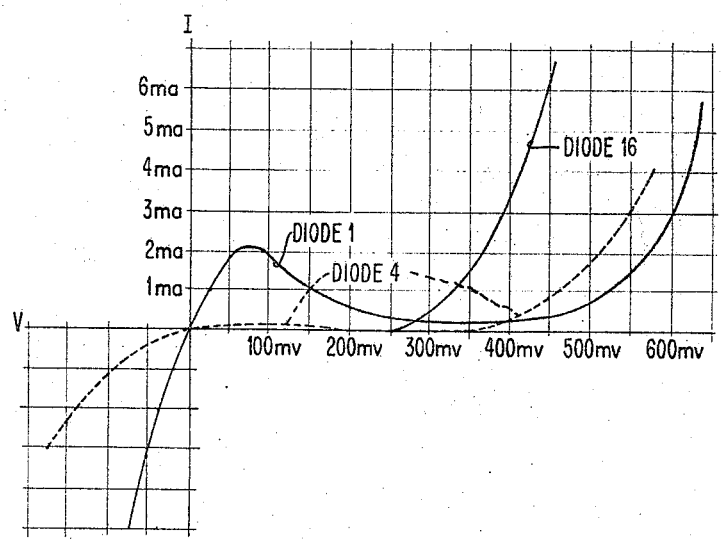
FIG. 3
INVENTOR
FRIEDRICH A. KARNER
BY John C. Black
ATTORNEY

United States Patent Office 3,427,472
Patented Feb. 11, 1969

This invention relates generally to switching circuits, and more particularly to switching and threshold discriminating circuits which are capable of operating speeds in the fractional nanosecond range.

With the advent of micro-miniaturization and extremely high operating speeds in data processing apparatus, it has become particularly important to assure a high degree of reliability in the basic circuits which are combined into the functional units which make up the apparatus.

Accordingly, the test equipment which is utilized to determine the characteristics of these basic circuits becomes more and more sophisticated with the passing of time. Generally speaking, the circuits in the test equipment must necessarily have a speed of operation which is at least one generation ahead (e.g. at least one order of magnitude faster) of the circuits which it is testing. As the circuits which are to be tested achieve operating speeds (e.g. signal rise and fall times) in the order of one or a few nanoseconds, it becomes important to provide threshold level detecting circuits which can switch in fractional nanosecond time intervals in order to take real time measurements of the input and output slopes of the signals applied to and derived from the circuits being tested.

For example, in order to assure reliable operation of the tested circuits in conjunction with each other, specific criteria are defined which must be met by each and every circuit. One typical set of criteria calls for the measurement of time parameters along the leading and trailing edges of a bivalued digital input signal and the consequent output signal, e.g. when the leading and trailing edges reach ten percent and ninety percent of the maximum anticipated change.

The real time difference between the ten and ninety percent levels of a rise or fall time may frequently be of significance. Similarly, the real time difference between certain points on the leading and trailing edges of the same signal (e.g. input or output) and between certain points on the input and output signals is of importance.

Accordingly, a first pair of detectors is connected to the junction between a source of input signals and the input terminal of the circuit under test; and a second pair of detectors is connected to the output terminal of the circuit under test. Each of the detectors is set to produce an output signal incident to the detection of a predetermined threshold. The detectors are associated with a switching time interval meter which is not a part of the present invention; and the meter utilizes the leading edges of the output signals of the detectors as the reference points in making lapsed time measurements along the leading edges of the input and output signals of the circuit under test.

In any detector circuit, an electrical charge must be transferred, thereby giving rise to an inherent time delay between the threshold being reached at the input to the detector circuit and the initiation of the leading edge of the detector output pulse. Since the real time measurements must be extremely accurate at fractional nanosecond time intervals, it is desirable that the switching time of each detector circuit be extremely fast so that its output pulse has a very steep slope relative to that of the input signal. What is of even greater importance, however, is the need to maintain the abovesaid inherent time delay essentially constant in a given detector. So long as the delay is constant and of known value, it can be taken into account in the ultimate parameter determinations.

In addition, it is important that the detector circuits do not, during switching, reflect voltage steps toward the input or output circuits to which they are coupled.

It is also important that they have extremely well-defined input signal thresholds that are substantially independent of the slope of the input signal and that they exhibit high input impedances so as to minimize their loading effect upon the input signal source.

It is therefore a primary object of the present invention to provide a reliable, high speed detector circuit with an extremely well-defined threshold level.

This object is achieved in a preferred embodiment by providing a transistor amplifier which is normally biased for operation in its linear region. A tunnel diode in the base circuit of the amplifier causes rapid switching of the amplifier to a substantially different level of conduction when the diode is switched from its low voltage to its high voltage state. A hot carrier diode couples the tunnel diode to the base electrode of the amplifier. The input circuit of the tunnel diode includes a first path which is coupled to the source of input signals. The input circuit of the tunnel diode also includes a second path which is connected to a programmable source of potential. Means, the details of which are not a part of the present invention, set the abovesaid source of potential of the second path at a level which is equal in value and opposite in polarity to the input signal level (threshold) which is to be detected. A constant current bias source is provided for the tunnel diode. A backward diode couples the two input paths to the tunnel diode and is normally operated in a low current, forward bias point in its voltage-current characteristic.

When the input signal level reaches the input threshold level, the input terminal to the backward diode is essentially at ground potential. The tunnel diode is biased so that at this instant in the cycle of operation it operates at an infinitesimally small increment below the peak current value of its stable, low voltage region of operation, whereby only a few femto-coulombs ($10^{-15}$) of additional energy need be supplied to switch the tunnel diode to its high voltage region.

Hence, the input signal level need rise only an infinitesimally small amount above the equal and opposite bias potential applied to the second input path to trigger the tunnel diode. When the tunnel diode switches to its high voltage state, it immediately applies a higher forward bias to the backward diode, whereby the backward diode is instantly forced to a low current, forward bias region of operation to isolate the tunnel diode from its input circuit and from the source of input signal. This is of particular importance for preventing the reflection of the tunnel diode output pulse into the input circuit and into the source of input signals.

As the tunnel diode switches from its low voltage to its high voltage state, the hot carrier diode rapidly switches to its low impedance region to drive the transistor amplifier to a high conduction level. An output signal is taken from the collector electrode of the amplifier. A hot carrier diode which enters into its low impedance region at approximately two hundred millivolts forward bias is preferably selected so that it switches while the tunnel diode is in its negative resistance region. The hot carrier diode guarantees operation of the amplifier only in response to switching of the tunnel diode (rather than in response to the input signal to the tunnel diode) and assures an extremely short and constant time delay between the instant at which the input signal reaches threshold value at which the tunnel diode begins to switch and the instant in time at which the amplifier begins to switch.

It will be appreciated that the improved detector circuit is particularly well adapted for operation within an environment in which a computer is utilized to control the automated testing and sorting of circuits.

The improved detector circuit described above also forms the basis for a particularly useful digital logic circuit in an environment in which its substantially higher speed of operation is required. More than one input circuit can be coupled to the tunnel diode by way of a backward diode to control its state of operation. Output signals can be inverted by the amplifier or can be produced in non-inverted form at the output of the hot carrier diode by removal of the amplifier.

Accordingly, it is another important object of the present invention to provide an improved signal translating and/or logical circuit which is capable of operation at speeds in the fractional nanosecond range.

The foregoing and other objects, features and advantages of the invention will be apparent from the following more particular description of a preferred embodiment of the invention, as illustrated in the accompanying drawings.

In the drawings:

FIG. 1 is a schematic diagram of the improved tunnel diode-transistor switching and detecting circuit of the present application and a block diagram of one environment within which it is used;

FIG. 2 is a waveform illustrating the time measurement error introduced by somewhat similar tunnel diode-transistor detecting circuits which do not incorporate the improvements of the present invention;

FIG. 3 illustrates the voltage-current characteristics of a tunnel diode, a backward diode and a hot carrier diode utilized in the circuit of FIG. 1;

Figure 4:
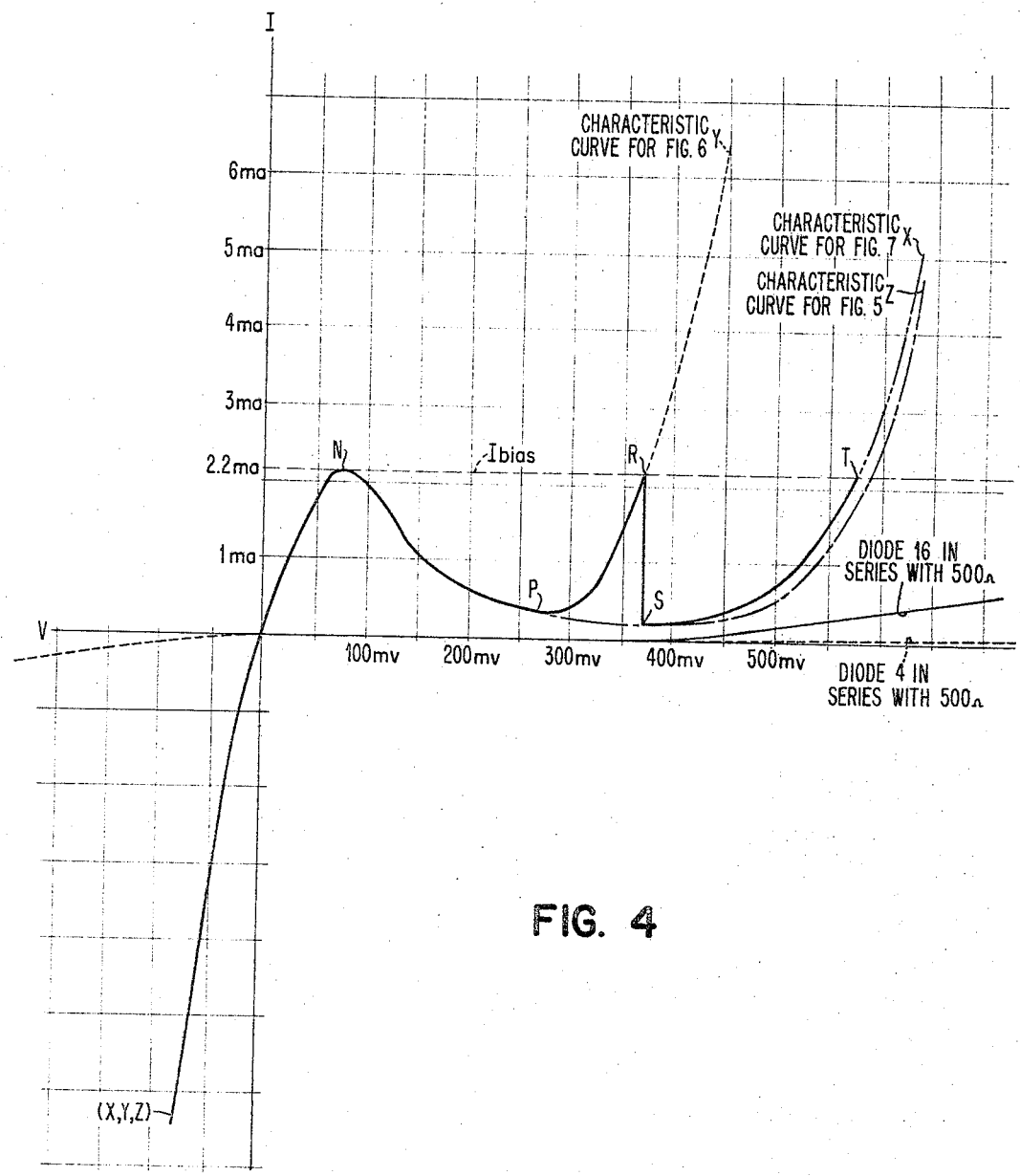
Figure 5:
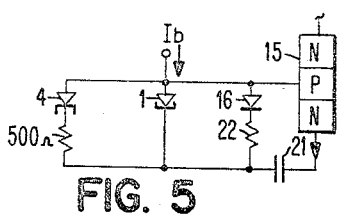
Figure 6:
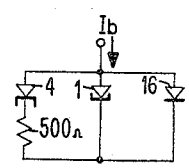
Figure 7:
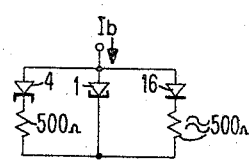

FIG. 4 shows a various composite voltage-current characteristics to more clearly illustrate the operation of the circuit of FIG. 1; and FIGS. 5-7 illustrate equivalent circuit conditions which exist when the circuit of FIG. 1 is respectively in its initial state, when the tunnel diode begins to switch and when the circuit of FIG. 1 reaches a steady state condition subsequent to the switching of the transistor in the circuit of FIG. 1.

As seen in FIG. 1, a plurality of threshold detector circuits TD1, TD2, TD3 and TD4 are connected to the input and output terminals of a circuit 9 which is under test. Each is designed to detect a specific input or output signal level.

The detector circuit TD1 includes a tunnel diode 1 having its cathode connected to ground potential and having its anode connected to a source of constant current bias 2. An input circuit 3 is coupled to the junction C between the tunnel diode and its bias supply by means of a backward diode 4.

The input circuit 3 includes two paths, one of which includes a programmable source of voltage 5 connected to the input electrode of the backward diode by way of a resistor 6 and a junction B. A capacitor 7, interposed between the voltage source 5 and the resistor 6, shunts the high frequency signals to ground to isolate the supply 5 from the high frequency signals which are to be detected by the circuit of FIG. 1.

The input circuit 3 also includes an input terminal A and a resistor 11 which couples the junction B to a source of signals 10, the level of which is to be detected. In FIG. 2, the input signal 30 shown in solid line has two voltage levels 31 and 32 on its leading edge which are to be detected by detectors TD1 and TD2 respectively. The resistors 6 and 11 are preferably of equal value and form a voltage divider in the input circuit. The source of bias 5 is selected to have a value which is essentially equal in value and opposite in polarity to the input signal threshold level at the terminal A which is to be detected by the circuit of FIG. 1. Consequently, when the input signal level at the terminal A reaches the threshold level, the voltage level at the junction B is essentially at ground potential.

The anode of the tunnel diode is connected to the base electrode of a high speed transistor pulse amplifier 15 by way of a hot carrier diode 16. The collector electrode of the amplifier 15 is connected to an output terminal E and to a positive supply terminal 17 by way of a resistor 18. The emitter electrode of the amplifier is connected to a negative supply terminal 19 by way of a resistor 20. A capacitor 21 couples high frequency signal changes from the emitter electrode to ground. The base electrode of the amplifier is connected to ground potential by way of a junction D and a bias resistor 22.

The emitter supply potential and the resistors 20 and 22 normally forward bias the base-emitter junction of the amplifier 15 to a selected point in the linear region of operation.

Let it be assumed that the tunnel diode is in its low voltage state (e.g. sixty millivolts) and that the amplifier 15 is biased as described above in its linear region of operation. The hot carrier diode 16 will be slight forward biased; however, this bias is so low that the hot carrier diode is in its region of high impedance. Preferably, this diode starts to enter its low impedance at or slightly above two hundred millivolts forward bias.

It will be assumed by way of example that an input signal level at the terminal A will be detected at a threshold value of plus one volt. The voltage applied by the source 5 to the resistor 6 will therefore be minus one volt. It will be assumed further that, initially, the input signal level at the terminal A is at ground potential; consequently, the potential at the junction B will be at some negative potential less than minus one volt (e.g. approximately three hundred-fifty millivolts) determined by the voltage divider resistors 6 and 11, the backward diode 4, the tunnel diode 1 and the source of bias current 2.

The backward diode will be in its forward bias, intermediate impedance region of operation. As is well known, the backward diode is in the nature of a degraded tunnel diode, i.e. the impurity doping level is such that the initial positive-negative resistance regions exhibit high resistance to current flow. The substantial current will flow only when the bias voltage is in the reverse bias sense or alternatively, when the forward bias reaches a value (e.g. about four-tenths to seven-tenths volt) at which normal diode action is initiated. Between these two regions, the current level is low.

FIG. 5 illustrates the equivalent circuit at this time. Substantially none of the bias current flows through the hot carrier diode because of its high impedance. The circuit operates along the characteristic curve Z—Z of FIG. 4 at this time.

As the input signal 30 at the terminal A approaches the threshold level 31, the voltage at the junction B rises essentially to ground potential. At this point, the bias current delivered to the tunnel diode by the source 2 is an infinitesimally small amount below the peak current point N (FIG. 4) adjacent the negative resistance region. An infinitesimally small increase in the input voltage at the terminal A will cause a few femto-coulombs of additional energy from the source 2 to be diverted from the backward diode and into the tunnel diode to switch the latter through its negative resistance region and into its stable high voltage state (e.g. approximately five hundred millivolts). As is well known, this switching of the diode to the high voltage state is extremely fast and can be a small fraction of a nanosecond by selection of a diode with the desired characteristic.

FIG. 6 illustrates the equivalent circuit as the tunnel diode passes through its negative resistance region; and the circuit operates along along curve Y—Y.

More specifically, when the tunnel diode switches to the negative resistance region, the operating point moves from N to P (FIG. 4). When the voltage at the junction C reaches a value somewhat above two hundred millivolts, the hot carrier diode enters its low impedance region to deliver energy from the source 2 to amplifier 15. The operating point of the circuit then begins to move from point P toward point R.

The initial transient change in emitter current of the amplifier 15 is shunted to ground by the capacitor 21; and the diode 16 is essentially grounded. Thus in FIG. 6, the diode 16 is shown coupled directly to the reference potential. The value of the bias current from the source 2 limits the maximum value of current through the diode 16. After this value is achieved, the current through the diode 16 and the base of the amplifier 15 begins to decrease toward a steady state value. The composite operating point of the circuit moves approximately along the solid line path extending from point R to point S and then to point T on curve X—X. The steady state equivalent circuit at this time illustrated by FIG. 7.

The positive-going voltage transient across the tunnel diode instantly drives the backward diode to a higher impedance, lower current region. The backward diode has essentially no stored charge effects so that the time required to enter its higher impedance region is essentially non-existent. Hence, the backward diode instantly isolates the tunnel diode from the input circuit 3 and thereby effectively prevents the step voltage generated by the tunnel diode from being reflected into the input circuit. With no signal reflection into the input circuit, the voltage at the junction A will follow the solid line leading edge 30 illustrated in FIG. 2.

Without the instantly effective isolation provided by the backward diode, a reflection from the tunnel diode into the input circuit 3 will cause a step 33 (FIG. 2) in the leading edge of the input signal 30. This step 33 will introduce a time error $\Delta t$ in the detection of the threshold level 32 by the detector TD2.

In any discriminator circuit which is utilized in conjunction with a switching time interval meter, it is desirable to have a minimum, but absolutely constant time delay between the instant in time at which the signal to be detected reaches the precise threshold value and the generation of a discriminator output pulse.

As we have seen above, the amount of energy which must be diverted from the backward diode to switch the tunnel diode when the threshold is reached, is so small as to result in an insignificant time delay in initiating switching of the tunnel diode. Further, this energy is so small that the threshold value which initiates triggering of the tunnel diode does not significantly vary with the slope of the input signal. By selecting a tunnel diode having a switching time which is extremely short, i.e. substantially below one nanosecond, the time delay during the switching of the diode from the low voltage to the high voltage state is minimized.

Theoretically, it would be desirable to directly connect the tunnel diode to the base electrode of the amplifier 15 to minimize cumulative time delays. However, it has been found that in an amplifier circuit such as that disclosed, its sensitivity is so great that the amplifier may begin to switch and produce an output signal in response to the switching of the tunnel diode or alternatively in response to the energy supplied for switching the tunnel diode. This results in the leading edge of the amplifier output pulse occurring nonuniformly within a small but variable time interval after the input signal reaches the threshold level.

Consequently, the hot carrier diode 16 is interposed between the tunnel diode and the amplifier to guarantee initial operation of the amplifier only in response to switching of the tunnel diode.

The cumulative delay introduced by this diode is minimized to the point where it becomes reasonably insignificant. The hot carrier diode very closely resembles an ideal diode. The delays associated with turn on and turn off are so small as to be substantially insignificant with respect to the lapsed time intervals being measured. The hot carrier diode can be of either the hot hole or the hot electron type, but the latter is preferable because the higher electron mobility provides better performance at the high speeds of operation contemplated. Turn-on delays of fifty picoseconds are available in hot carrier diodes and the turn-off delays are significantly shorter, practically incapable of measurement at this time.

Further, a hot carrier diode is preferably selected which enters the low pressure impedance, high conductivity region of operation at a voltage level which is substantially below that of the high voltage level of the tunnel diode, e.g. two hundred millivolts. Consequently, the hot carrier diode switches energy into the amplifier 15 to drive it to a higher level of conduction during the time interval that the tunnel diode requires to move from its peak current value at point N through its negative resistance region toward its lowest current value. This time interval is a small fraction of the time required for the tunnel diode to switch from the peak current value to the high voltage positive resistance region of stable operation.

The cumulative time delay from the threshold voltage being achieved at the input terminal A to the leading edge of a pulse produced at the output D of the diode 16 is essentially a small part of the switching time of the tunnel diode, the short turn-on time of the the hot carrier diode and the normal propagation time through the various components. An additional delay is introduced by the amplifier 15 when it switches to produce an output pulse at the terminal E, however, by proper selection of components, this delay can be maintained constant and of short duration.

The following values for the components of FIG. 1 are given by way of example; however, the invention is not to be limited thereto:

| Resistors: | Values |
|---|---|
| 6, 11, 22 | ohms__ 1000 |
| 18 | do____ 500 |
| 20 | do____ 2000 |
| Capacitors: | Values |
| 7, 21 | picofarads__ 5000 |

In the event that the circuit of FIG. 1 is used as a logical switching circuit, the supply voltage for the amplifier 15 is preferably reduced to a low value, e.g., three volts; and the resistors 18 and 20 are preferably selected with values in the order of one hundred ohms and five ohms respectively.

It will be appreciated that the circuit of FIG. 1 can be operated in such a manner that in the initial state, the tunnel diode 1 is in its high voltage state, the diode 16 is in its low impedance state and the amplifier 15 has its component values proportioned so that the amplifier is conducting at a significant current level. In response to a negative-going signal, the tunnel diode is switched to its low voltage state causing the diode 16 to enter its high impedance state and reducing the current level in the amplifier 15 to a low (or zero) value.

It will be further appreciated that the complement of the circuit of FIG. 1 may be used. That is, the polarities of the diodes, the current source and the voltage supplies are reversed and the conductivity type of the transistor 15 is changed.

The detailed description to this point has been directed to the use of the detector circuit of FIG. 1 in the environment of measuring time parameters of electrical phenomenon, i.e. to detect or discriminate one or several points along a time axis. It has been suggested that this circuit also forms the basis of a significantly improved, ultra high speed signal translating or logical circuit.

As a digital signal translating device, the circuit shown in FIG. 1 would be typified as an inverter. It will be appreciated that, by using a plurality of input circuits such as 3, each having a backward diode such as 4 connected to the junction C, a positive OR logical circuit can be provided. Also a plurality of input resistors 11 can provide a logical AND or OR function. Other known input circuits can also be used, e.g. one which does not include the bias 5.

It will be also appreciated that a non-inverting signal translation device and/or or logical device can be provided by removing the amplifier 15 or alternatively, providing an additional stage of inversion.

The slope of the output signal of the amplifier 15 can be increased by use of teachings of U.S. Patent No. 3,200,257, issued Aug. 10, 1965 to Ivars G. Akmenkalns. In this patent, a tunnel diode is connected in the collector circuit of a transistor amplifier to produce at the collector electrode an output pulse, the rise and fall times of which are essentially those of the faster tunnel diode.

These and other well-known circuit techniques and expedients are well known to those in the art and can be utilized to modify the specific embodiment of FIG. 1 without the exercise of inventive skill.

While the invention has been particularly shown and described with reference to a preferred embodiment thereof, it will be understood by those skilled in the art that the foregoing and other changes in form and details may be made therein without departing from the spirit and scope of the invention.

What is claimed is:
1. A threshold detector comprising:
   a tunnel diode;
   means normally biasing the diode for operation in an initial stable state;
   an input circuit adapted for connection to a source of input signals;
   a backward diode coupling the input circuit to the tunnel diode for switching the tunnel diode to another state when the input signal reaches a predetermined threshold value;
   a transistor amplifier;
   means normally biasing the amplifier for operation at one level of conduction; and
   a hot carrier diode connecting the tunnel diode and the background diode to the amplifier for operating the amplifier at a different level of conduction in response only to the switching of the tunnel diode from its initial stable state to said other state.
2. The detector of claim 1 wherein the tunnel diode bias means comprises:
   a constant current source biasing the tunnel diode for stable operation in either of said two states.
3. The detector of claim 2 wherein the constant current source intially biases the tunnel diode so that the current through the diode is an infinitesimal increment below its peak current value in its low voltage region when the input signal to the backward diodes reaches the threshold value, whereby only a few additional femtocoulombs of input energy into the tunnel diode will switch the latter from its low voltage to its high voltage state.
4. The detector of claim 3 wherein the amplifier bias means normally biases the amplifier in its linear region of operation.
5. The detector of claim 4 wherein the transistor amplifier includes:
   a capacitor coupling the initial change in emitter current produced by the switching of the tunnel diode to ground.
6. The detector of claim 5 wherein the input circuit is a symmetrical circuit comprising:
   an input control path adapted for connection to a source of supply potential equal in magnitude and opposite in polarity to the voltage of the input signal at its threshold value; and
   an input signal path adapted for connection to the source of input signals.
7. The detector of claim 6 wherein the background diode responds to the switching of the tunnal diode from its initial state to said other state for operating in its low current, forward biased region of operation to isolate the tunnel diode from the input circuit.
8. A high speed switching circuit comprising:
   a tunnel diode;
   means normally biasing the diode for operation in one stable state;
   a backward diode connected to the tunnel diode and adapted to receive input signals for switching the tunnel diode to another state; and
   a hot carrier diode connected to the tunnel and backward diodes and responsive to switching of the tunnel diode for producing an output signal.
9. The circuit of claim 8 wherein the bias means comprises:
   a constant current source biasing the tunnel diode for stable operation in either of two states.
10. The circuit of claim 9 together with:
    a transistor amplifier connected to the hot carrier diode for receiving output signals therefrom; and
    means normally biasing the amplifier in its linear region of operation.

References Cited
UNITED STATES PATENTS

| | | | |
|---|---|---|---|
| 3,214,608 | 10/1965 | Mollinga | 307—235 |
| 3,239,775 | 3/1966 | Putterman | 307—323 X |

JOHN S. HEYMAN, *Primary Examiner.*

U.S. Cl. X.R.

307—222, 223